JOSEPH P. BARKER.
Improvement in Harvester Cutter-Grinder.

No. 119,108.                                    Patented Sep. 19, 1871.

UNITED STATES PATENT OFFICE.

JOSEPH P. BARKER, OF VIENNA, OHIO.

IMPROVEMENT IN HARVESTER-CUTTER GRINDERS.

Specification forming part of Letters Patent No. 119,108, dated September 19, 1871.

*To all whom it may concern:*

Be it known that I, JOSEPH P. BARKER, of Vienna, in the county of Trumbull and State of Ohio, have invented a certain new and Improved Harvester-Cutter Grinder; and I do hereby declare that the following is a full, clear, and complete description thereof, reference being had to the accompanying drawing making part of the same.

Figure 1:
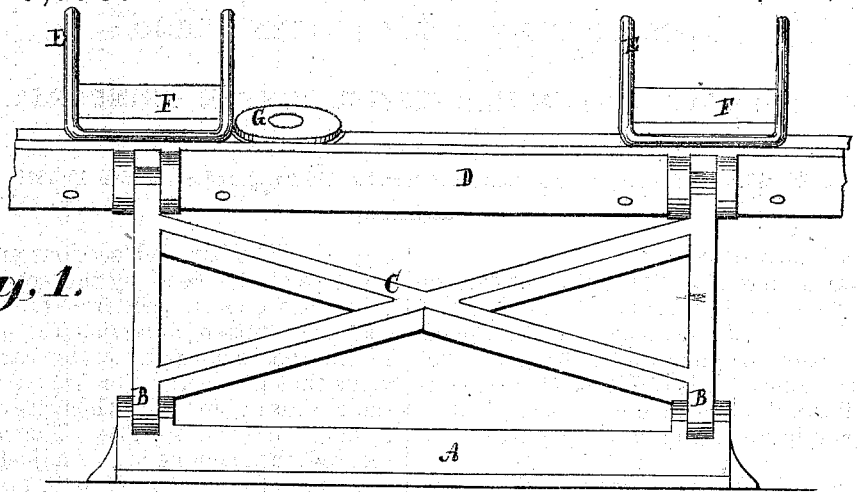
Figure 2:
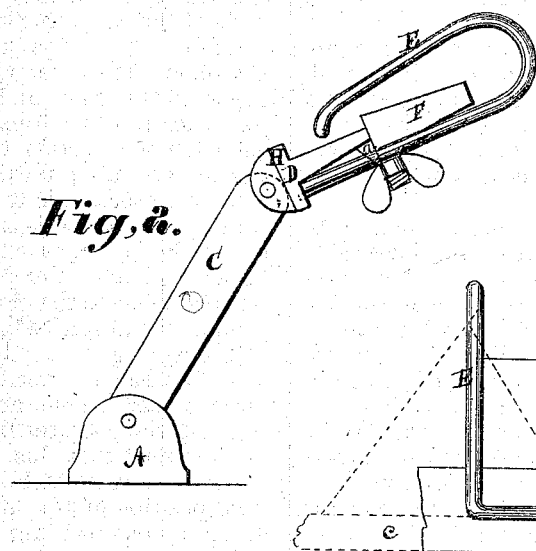
Figure 4:
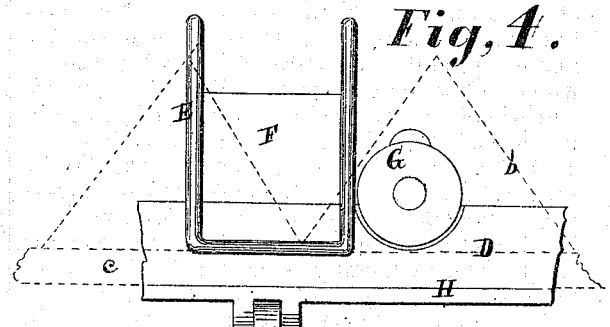
Figure 3:
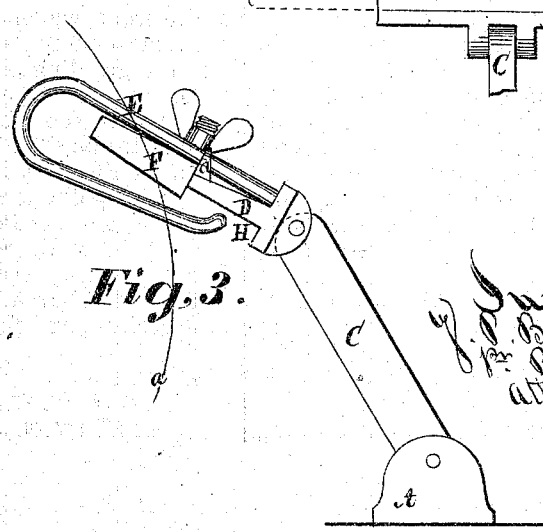

Figure 1 is a side view of the machine. Figs. 2 and 3 are end views, showing the head in different positions. Fig. 4 is a detached section.

Like letters of reference denote like parts in the different views.

The nature of this invention relates to an apparatus to be used in connection with a grindstone for the purpose of holding the knives of a harvester to said stone while being ground, so that the section shall be ground at a uniform angle and of an equal bevel, as hereinafter more fully described.

In the drawing, Fig. 1, A represents a bar, to which is hinged, at the points B, the lower side of the frame C. To the upper side thereof, in like manner, is hinged the head D, whereon the knives are laid and secured for grinding; all of which is made of cast-iron. E E are springs, and which are secured to one side of the head by having each of their ends inserted in a lug, *a*, having a hole therein for the admission of the said ends. Said springs are so arranged in their relation to the head as to embrace it between its two ends, as shown in Figs. 2 and 3, the purpose of which will presently be shown. F is a guard for protecting the edge of the knives. G is a roller whereby the cutter-bar and knives are held in a horizontal position.

The practical use and operation of this machine is as follows: It is secured in front of the stone, to the frame thereof, by means of a bolt passing through the bar A into the frame. Its relation to the stone when thus secured is shown in Fig. 3, in which the line *a* indicates the stone. The set of knives to be ground, and which is indicated by the dotted lines *b* in Fig. 4, is laid on the side of the head, so that the lower edge of the bar *c* thereof will rest upon the ledge or shoulder H, whereby it is supported, whereas its upper edge is immediately under the roller G, whereby the bar is held in a horizontal position while the sections near either end are being ground. The bar and sections are held fast to the side of the head by the springs E referred to, under which it is slid from the end, and which clamps the cutter-bar against the side of the head. In this position of the cutter-bar it will be obvious that the sections or knives will rest upon the guards or blocks F, which prevent them from contact with the springs. The cutter-bar thus secured, the machine is now adjusted to the edge or corner of the stone, so as to bring one side of the angle of a knife upon the stone by turning the machine at an angle with the face thereof, and which will be more or less according to the angle of the section or knife to be ground. This being done, the edge of the knife is allowed to rest upon the stone, which is now ground the length of the basil and to an edge by moving the head and the frame D C for that purpose. One edge of a section being ground, the bar is then shoved along until the corresponding edge of the next section is brought in proper position to the stone, which is then ground in like manner as the previous one, and so on to the end. As the bar slides along the sections are held by the springs upon the blocks or guards F, thereby keeping the ground edge safe from being struck by the springs. At the same time the roller holds the bar in a horizontal position while the sections near the end are being ground, thereby relieving the operator from the labor of sustaining its weight by his arms while grinding it. When one side of each section is ground the relative position of the apparatus to the stone is changed so as to bring it to the opposite corner of the stone, which, as a consequence, will bring the corresponding edge of each section in position for grinding, and which are ground in the same way as the edges above described. By this means the edges of all the sections are ground to the same angle, thereby obtaining for them a uniformity in their cutting power.

What I claim as my invention, and desire to secure by Letters Patent, is—

The springs E, guards or blocks F, and roller G, as arranged, in combination with the head D, frame C, and bar A, substantially in the manner as described, and for the purpose set forth.

JOSEPH P. BARKER.

Witnesses:
W. H. BURRIDGE,
J. M. LYON. (43.)